United States Patent
Ratliff et al.

(10) Patent No.: US 6,928,684 B2
(45) Date of Patent: Aug. 16, 2005

(54) AIRPORT BRIDGE AND LIFT

(75) Inventors: William Clay Ratliff, Burleson, TX (US); Fredrick Charles Keish, Jr., Fort Worth, TX (US)

(73) Assignee: JetBridge Technology, Inc., Kennedale, TX (US)

( * ) Notice: Subject to any disclaimer, the term of this patent is extended or adjusted under 35 U.S.C. 154(b) by 53 days.

(21) Appl. No.: 10/682,058

(22) Filed: Oct. 9, 2003

(65) Prior Publication Data

US 2004/0143916 A1 Jul. 29, 2004

Related U.S. Application Data

(63) Continuation-in-part of application No. 10/192,450, filed on Jul. 10, 2002, now Pat. No. 6,658,685.

(51) Int. Cl.[7] .............................................. E01D 12/00
(52) U.S. Cl. ......................................... 14/71.5; 186/22
(58) Field of Search ................................. 14/71.5, 69.5; 186/22; 187/200–204, 261, 354, 357, 364, 365; 414/399; 182/142

(56) References Cited

U.S. PATENT DOCUMENTS

| | | | |
|---|---|---|---|
| 2,700,169 A | | 1/1955 | Henion |
| 3,099,847 A | | 8/1963 | Lodjic et al. |
| 3,377,638 A | | 4/1968 | Seipos |
| 3,581,331 A | | 6/1971 | Fisher et al. |
| 4,161,049 A | | 7/1979 | Saunders et al. |
| 4,469,198 A | * | 9/1984 | Crump ........................ 182/141 |
| 4,559,660 A | | 12/1985 | Lichti |
| 5,074,496 A | * | 12/1991 | Rezag et al. .............. 244/118.1 |
| 5,267,368 A | | 12/1993 | Saunders |
| D383,216 S | | 9/1997 | Anderberg |
| 5,667,035 A | * | 9/1997 | Hughes ....................... 182/142 |
| D386,263 S | | 11/1997 | Anderberg |
| 5,704,086 A | | 1/1998 | Hansen et al. |
| 5,761,757 A | | 6/1998 | Mitchell et al. |
| 5,791,003 A | | 8/1998 | Streeter et al. |
| 5,855,035 A | | 1/1999 | Streeter et al. |
| 5,950,266 A | | 9/1999 | Streeter et al. |
| 6,105,728 A | * | 8/2000 | Combs, Jr. .................. 187/372 |
| 6,109,854 A | * | 8/2000 | Thompson et al. ......... 414/398 |
| 6,122,789 A | | 9/2000 | Stephenson et al. |
| 6,167,670 B1 | * | 1/2001 | Reite et al. ................... 52/637 |
| 6,212,724 B1 | | 4/2001 | Zhou |
| 6,390,757 B2 | | 5/2002 | Ganiere |
| 6,676,359 B2 | | 1/2004 | Ganiere |
| 2002/0084148 A1 | * | 7/2002 | Nygren ....................... 187/302 |
| 2003/0178259 A1 | | 9/2003 | Henderson |
| 2003/0213652 A1 | * | 11/2003 | Long .......................... 187/261 |
| 2003/0217891 A1 | | 11/2003 | Ganiere |
| 2003/0219329 A1 | * | 11/2003 | Ganiere ...................... 414/399 |
| 2003/0229955 A1 | | 12/2003 | Savage |

OTHER PUBLICATIONS

Thomas Telford House, Custom–made solutions with inbuilt flexibility for the industry. Oct. 24, 2000; Sec. No. 8, vol. 33; Pp. 15; 0002–2853; Thomas Telford Ltd, U.K.

Sherilee Clinch, Atlanta stresses its social side. Oct. 10, 2000; Sec. No. 7, vol. 33; Pp. 18; 0002–2853; Thomas Telford Ltd, U.K.

Jackie Potbier, A bridge further. 2000. PAssenger Terminal 2000; pp. 142–144; DEW Engineering.

Jackie Potbier, Mind the gap; Oct. 15, 1999; Pgs. 1–25; DEW–BRIDGE.

DEW–VALET Baggage System; Oct. 15, 1999; pp. 1–25; DEW–BRIDGE.

* cited by examiner

*Primary Examiner*—Thomas B. Will
*Assistant Examiner*—Raymond W. Addie
(74) *Attorney, Agent, or Firm*—Geoffrey A. Mantooth; L. Bruce Terry

(57) ABSTRACT

A lift is coupled to the outer cab or rotunda of a telescoping bridge. The lift has a carriage that can be moved by a cable and a motor upward or downward and which includes a platform that has sensing means for controlling the motor for stopping downward movement of the carriage when it engages the ground. An electrically operated safety catch is provided to prevent the carriage form falling in the event the cable breaks. A safety system is provided which prevents the bridge from moving if the carriage is not in the up position and its door is not closed.

6 Claims, 17 Drawing Sheets

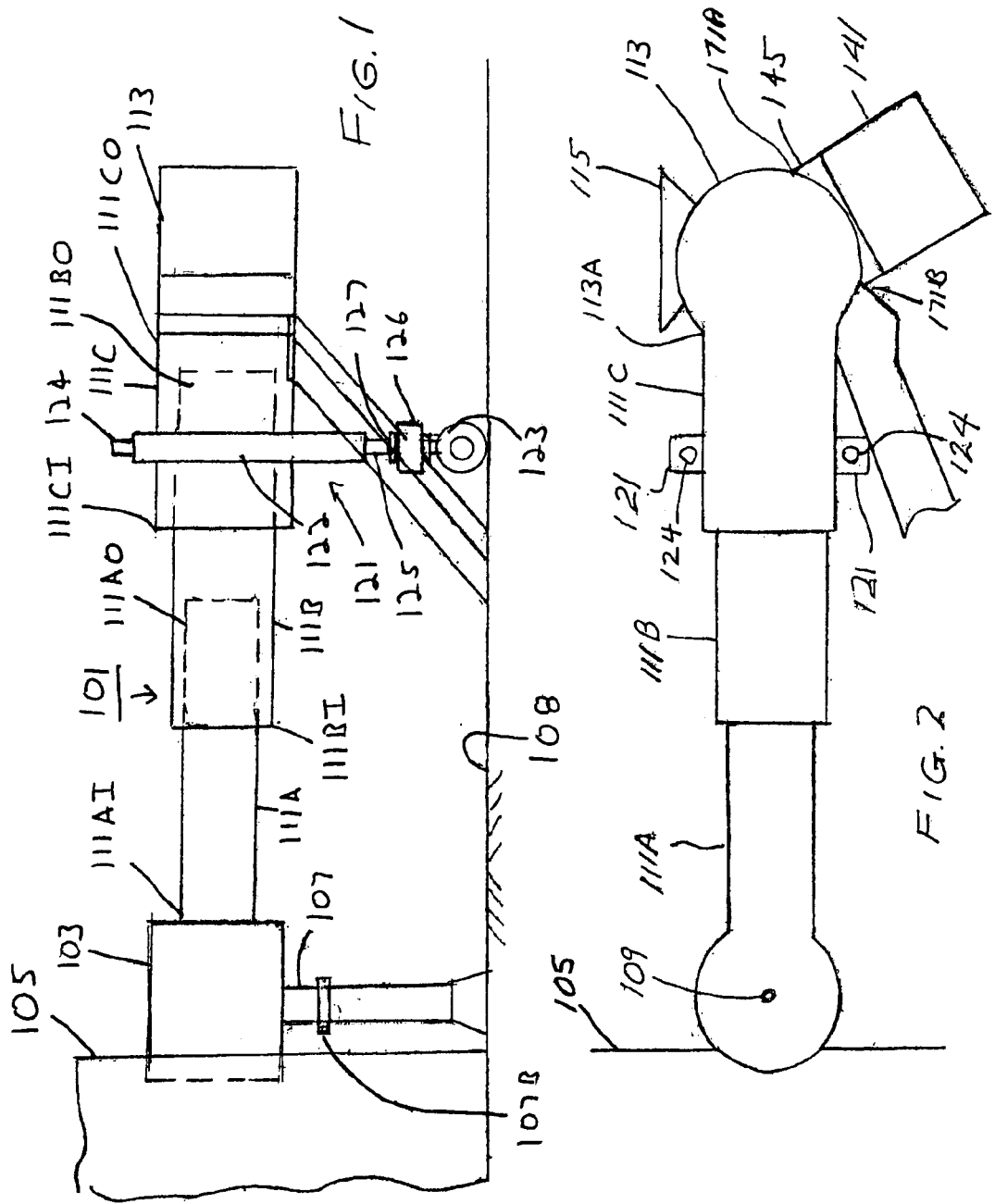

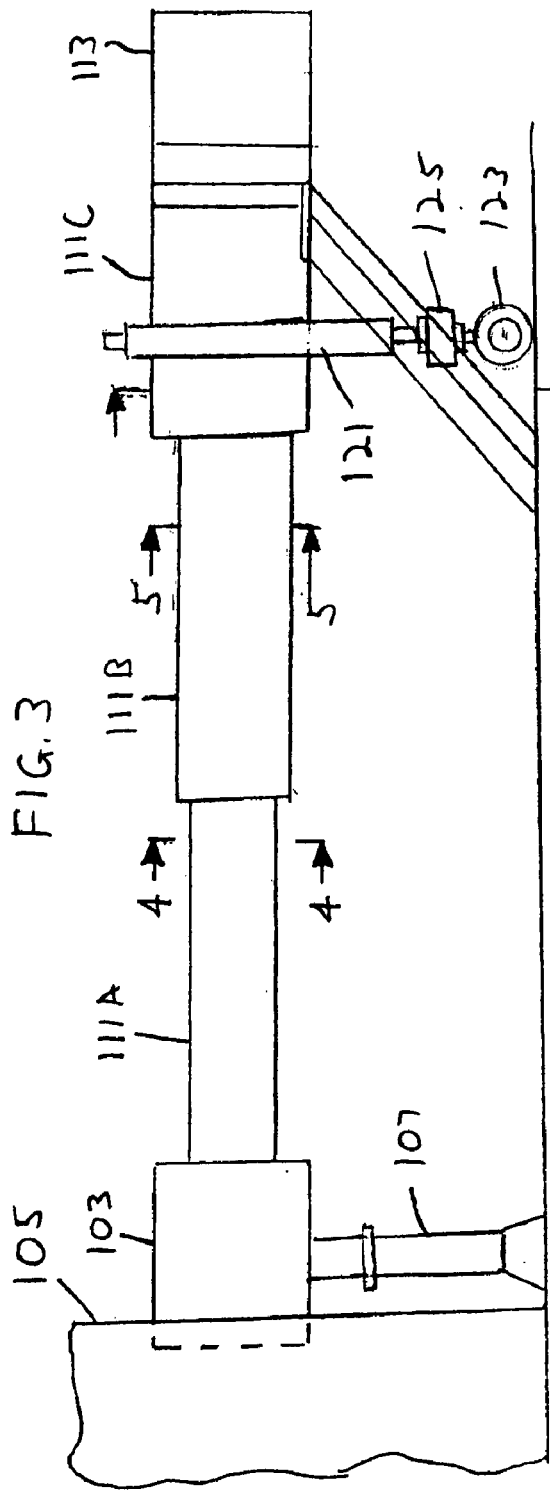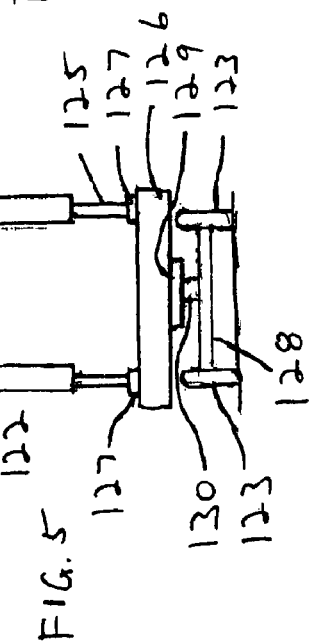

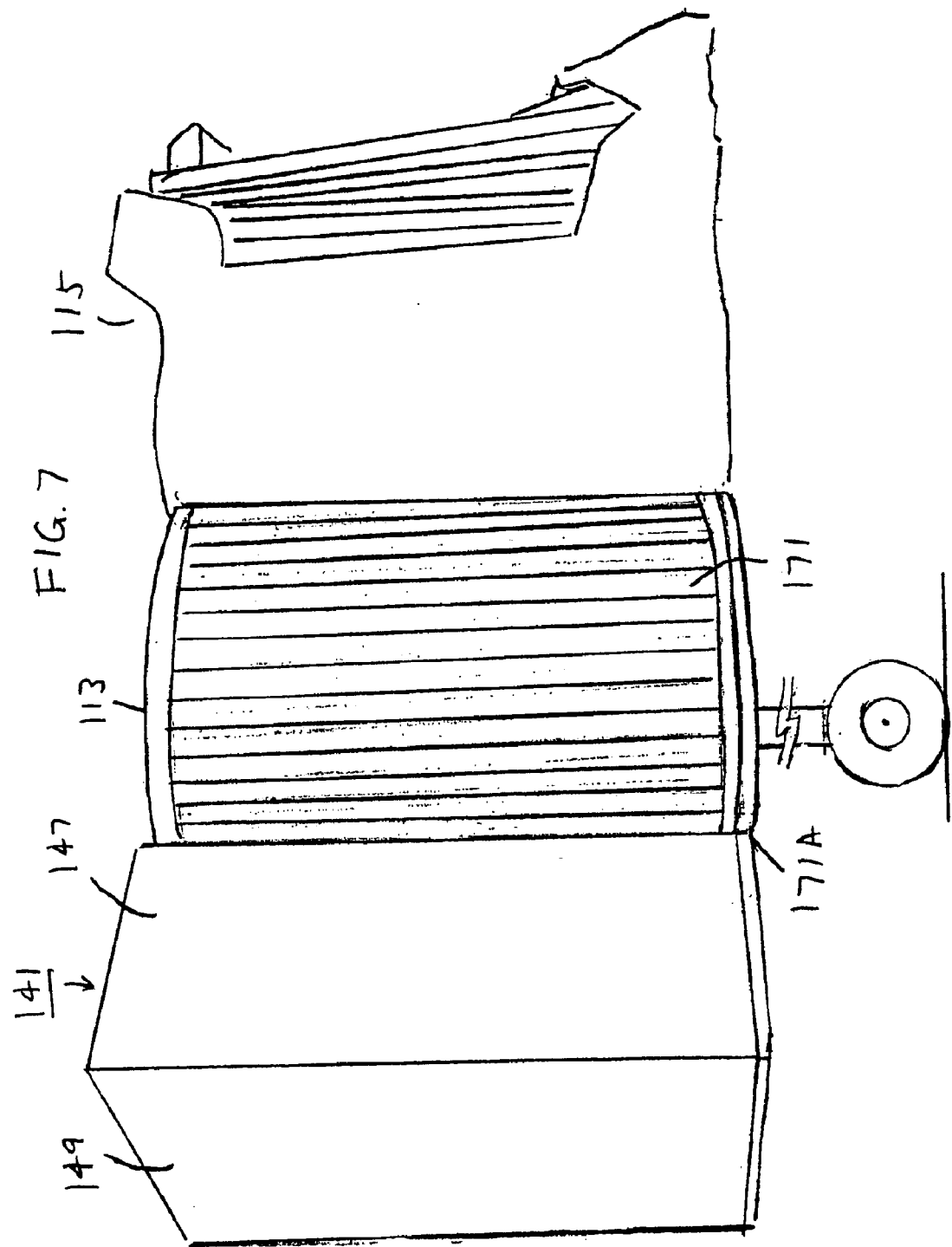

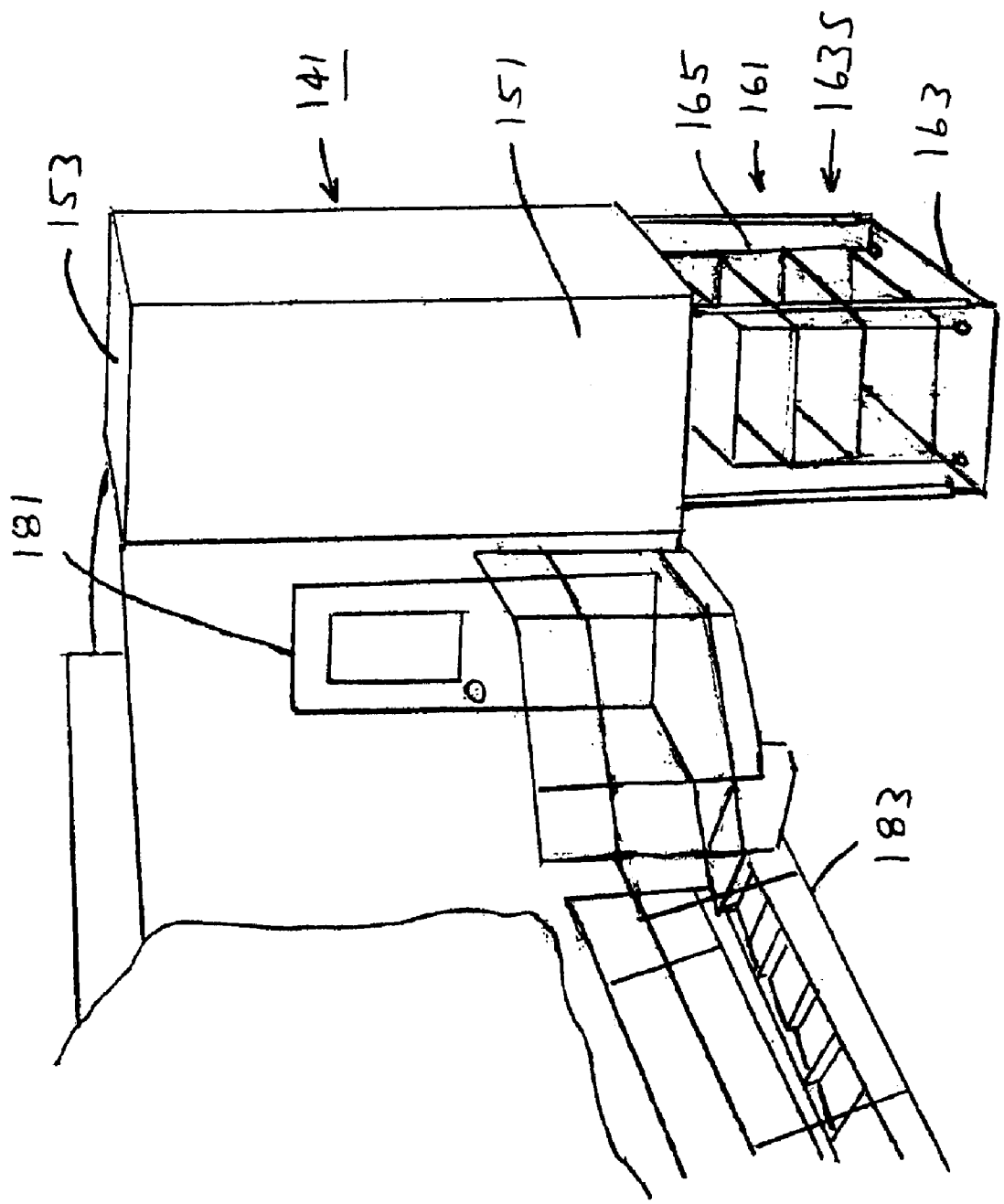

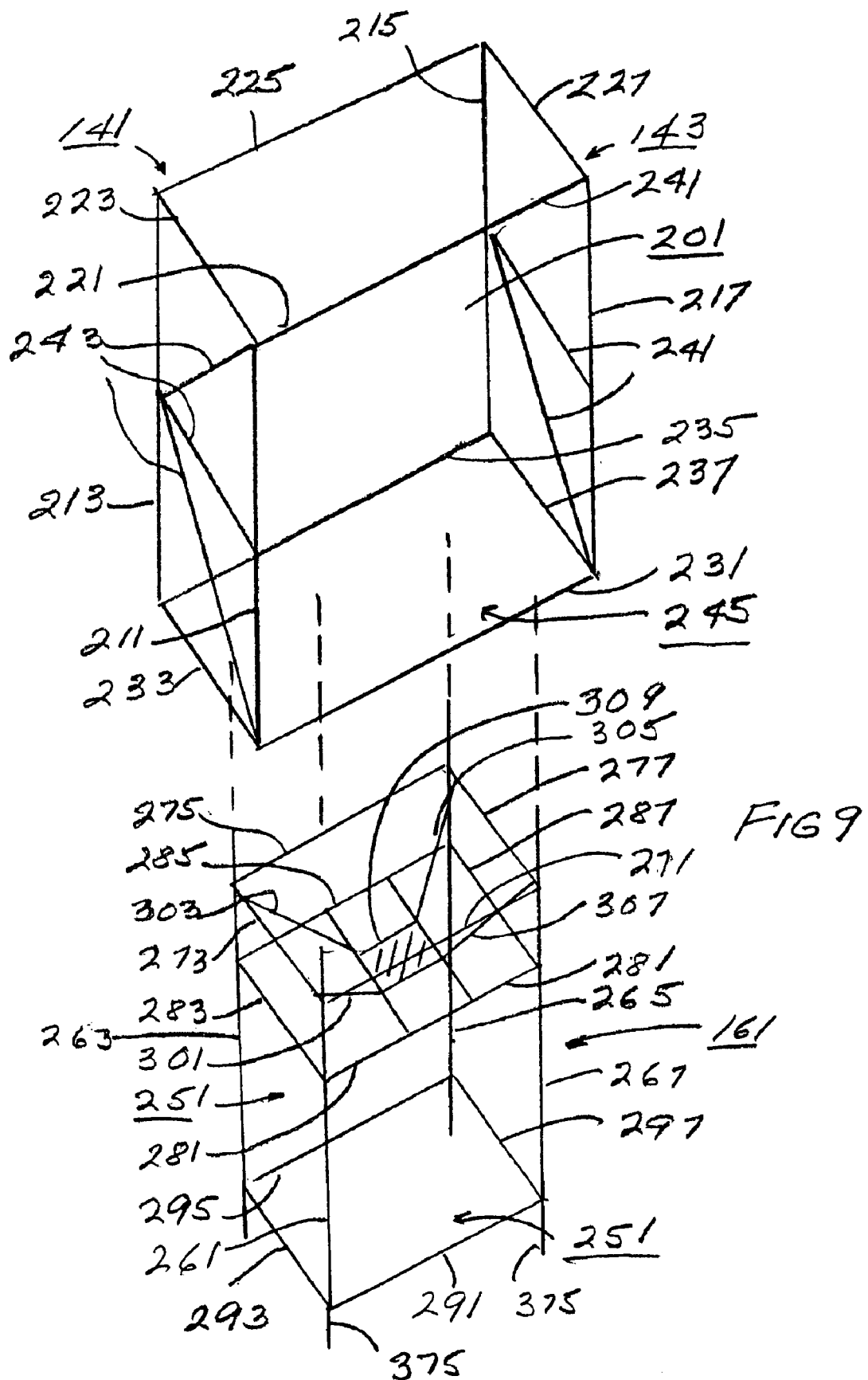

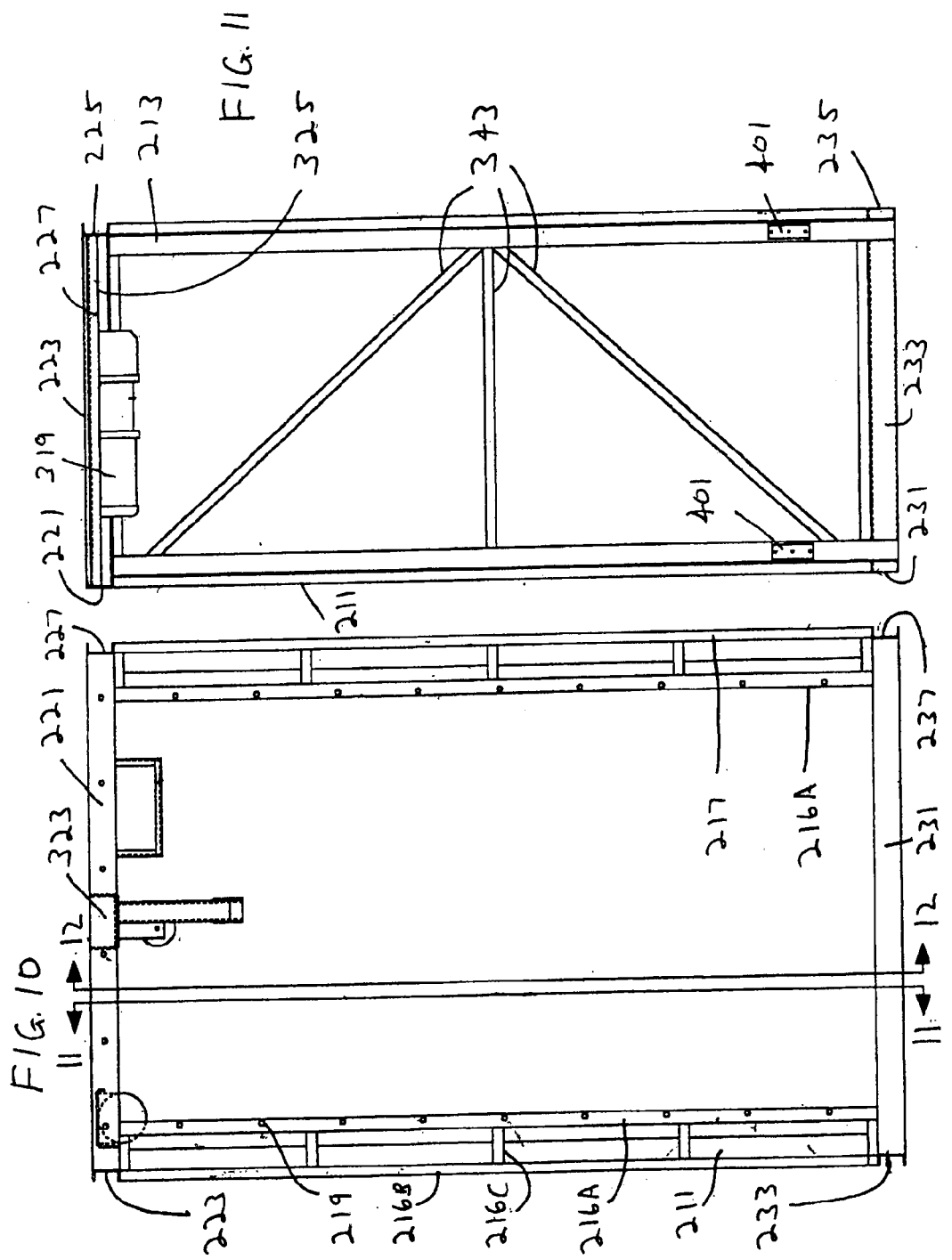

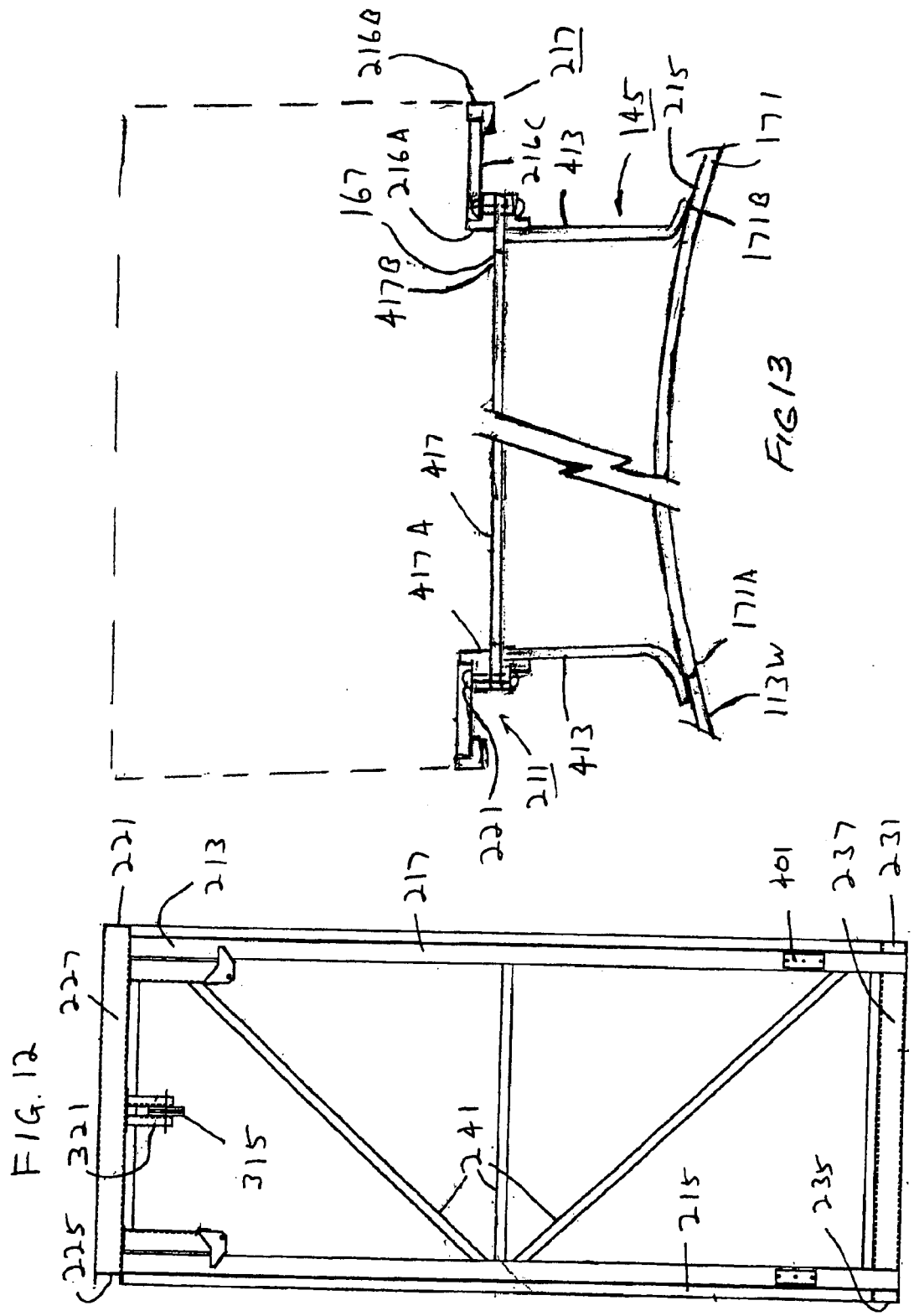

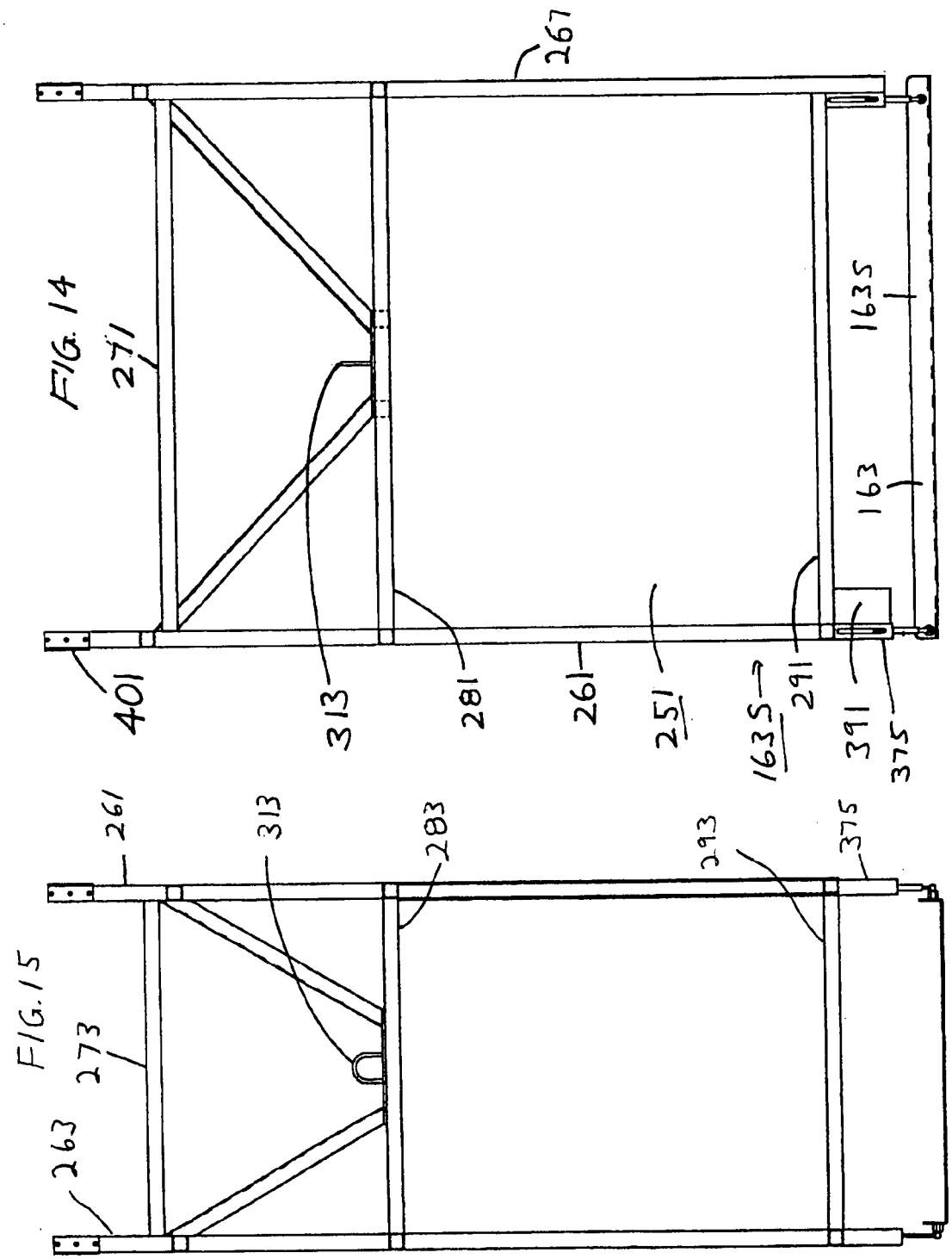

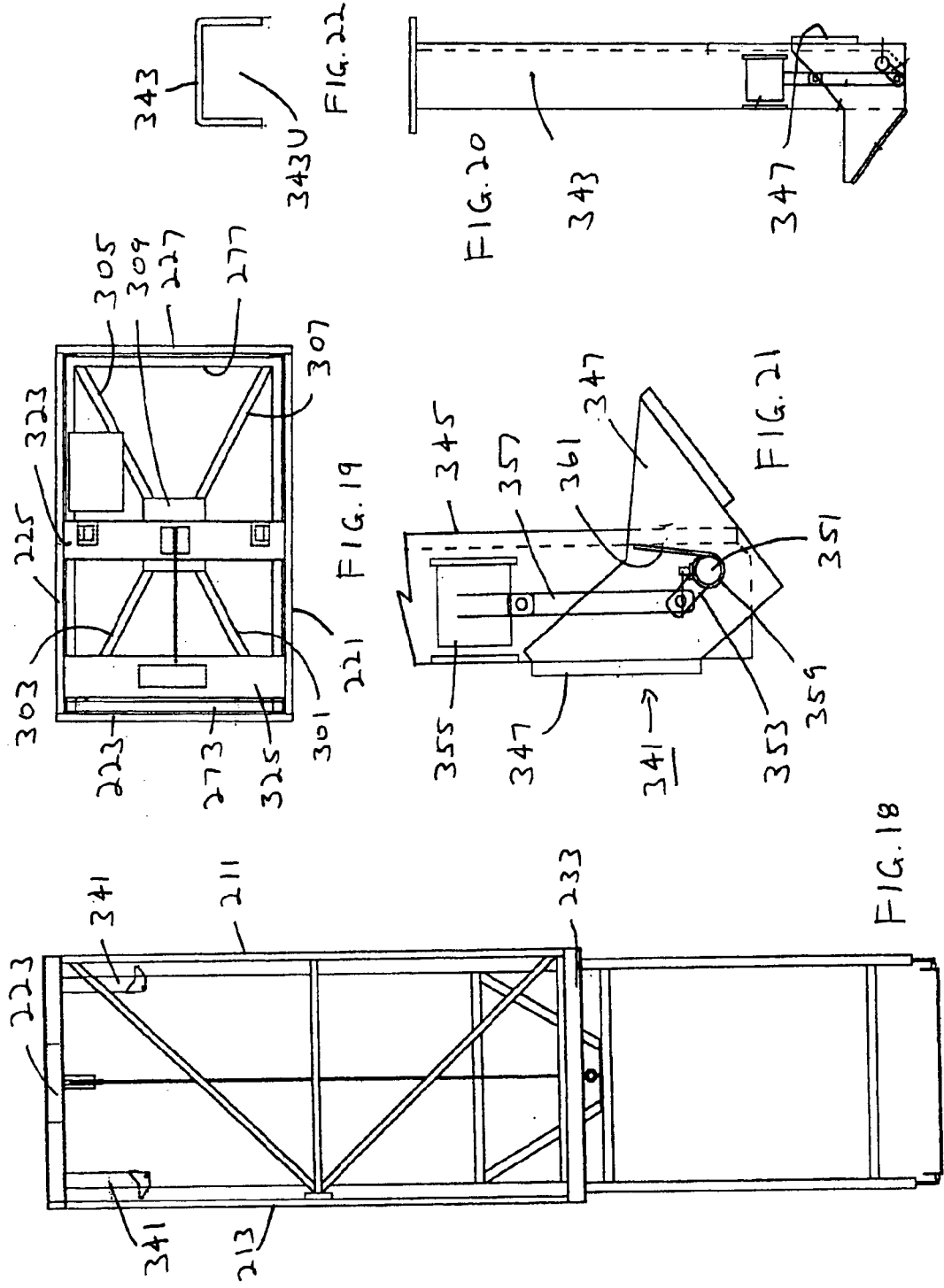

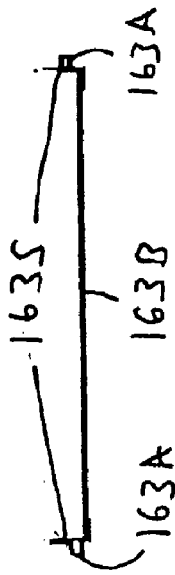
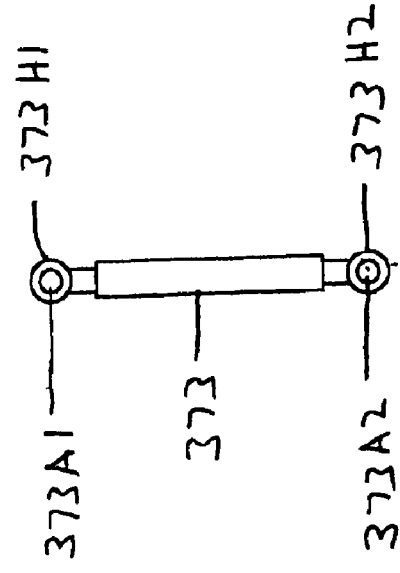
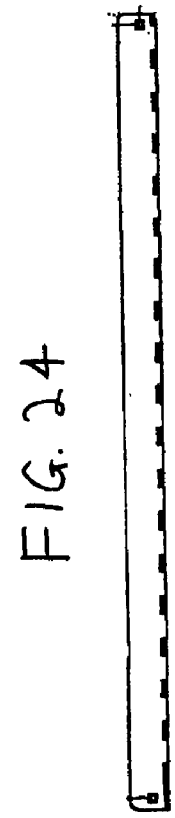
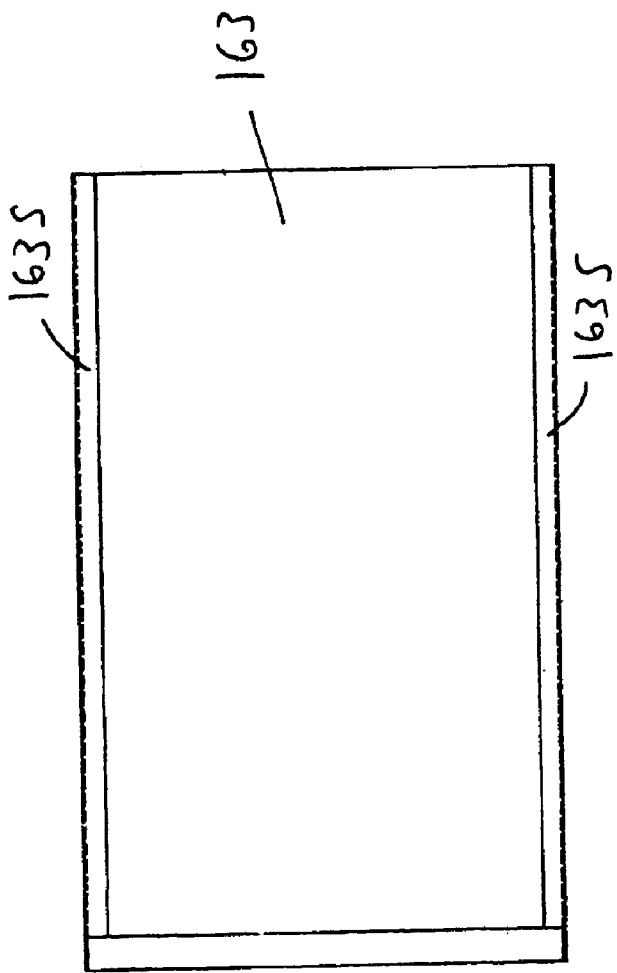

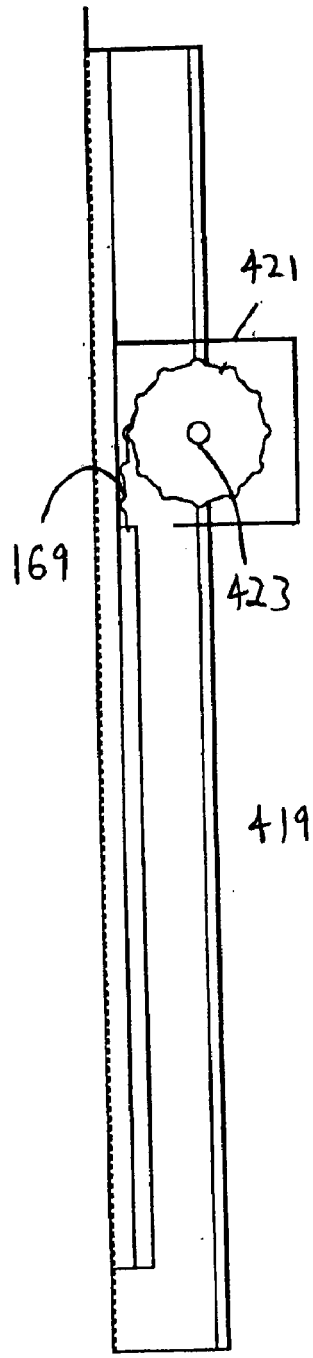
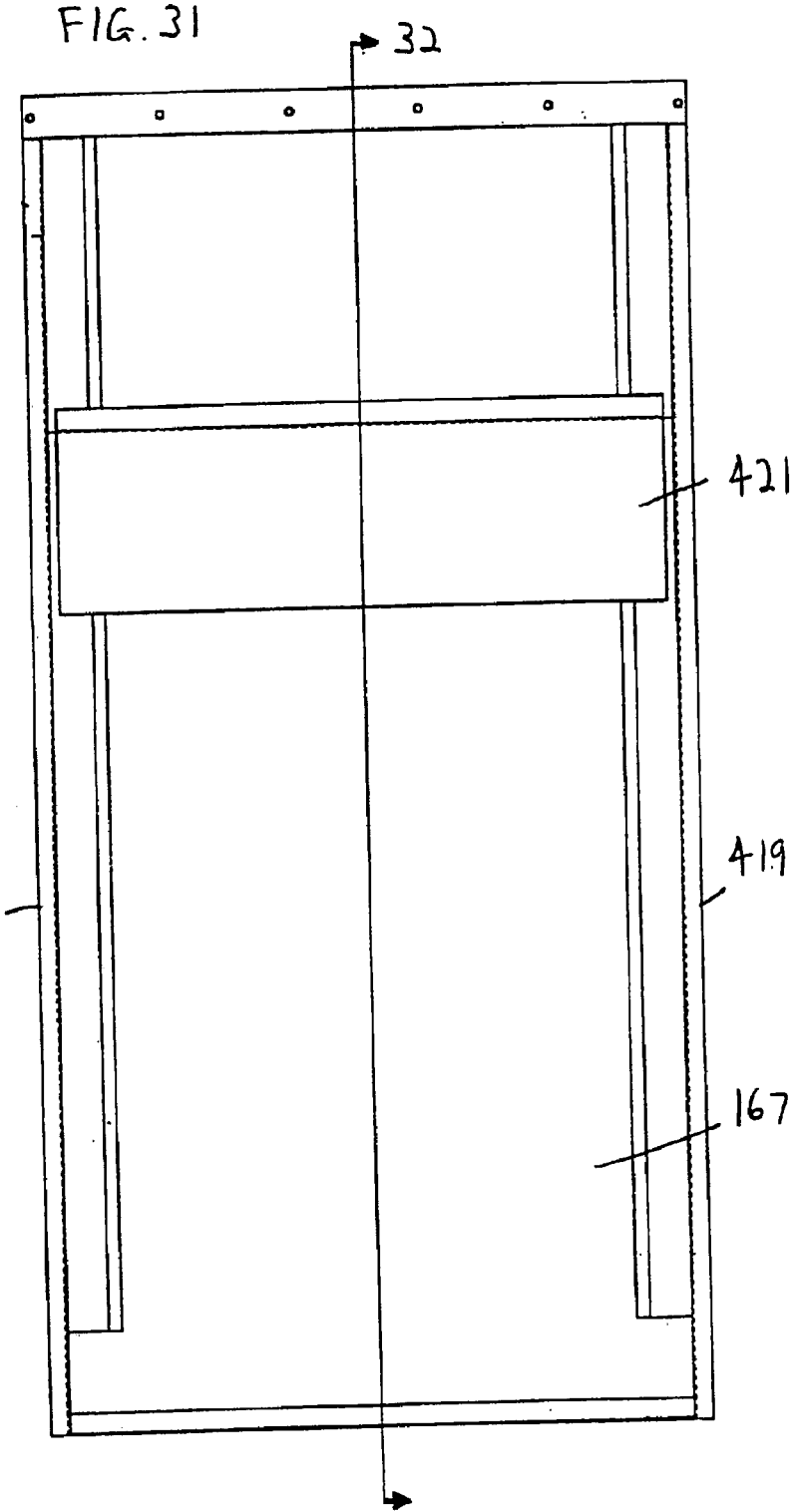

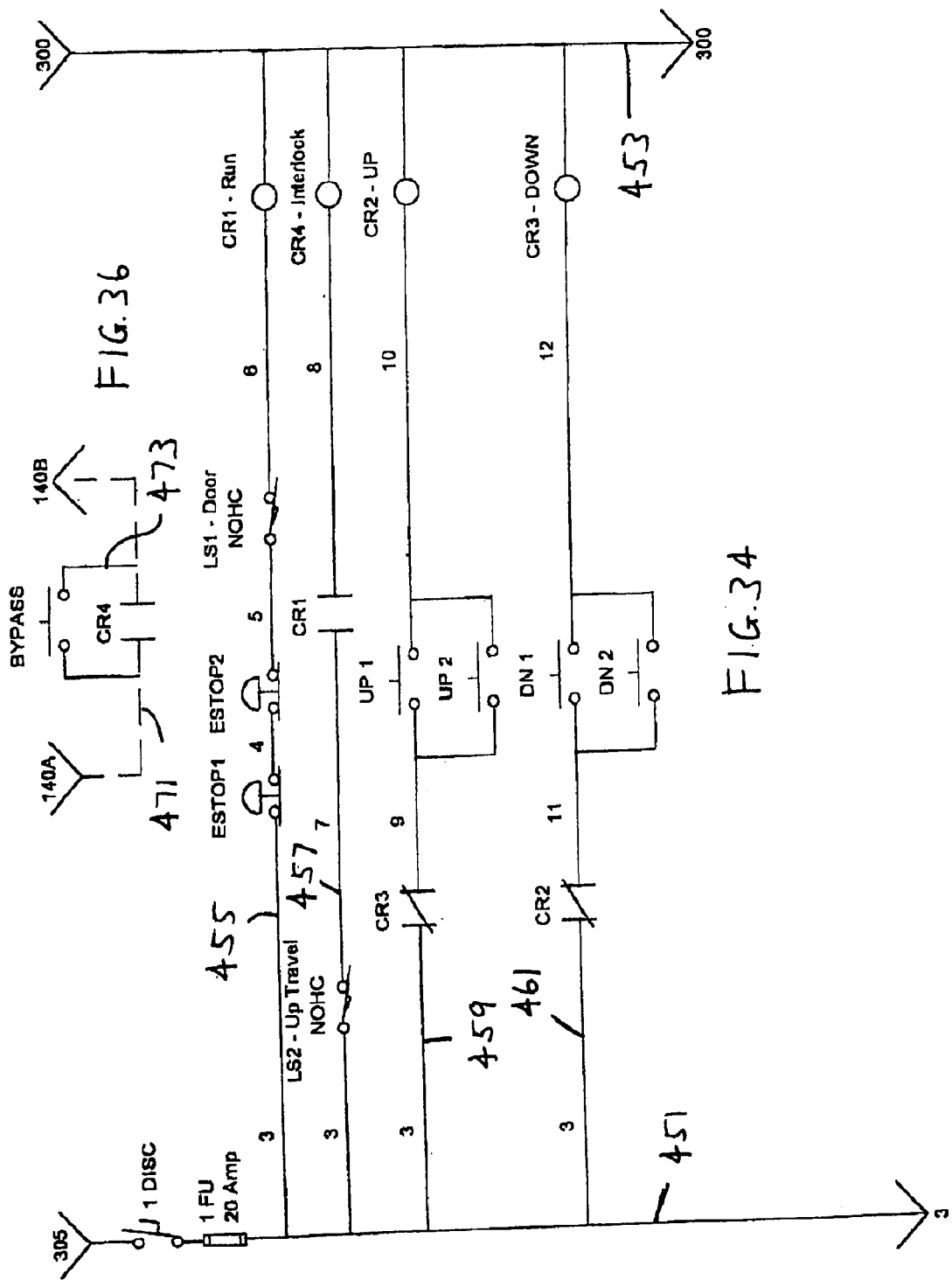

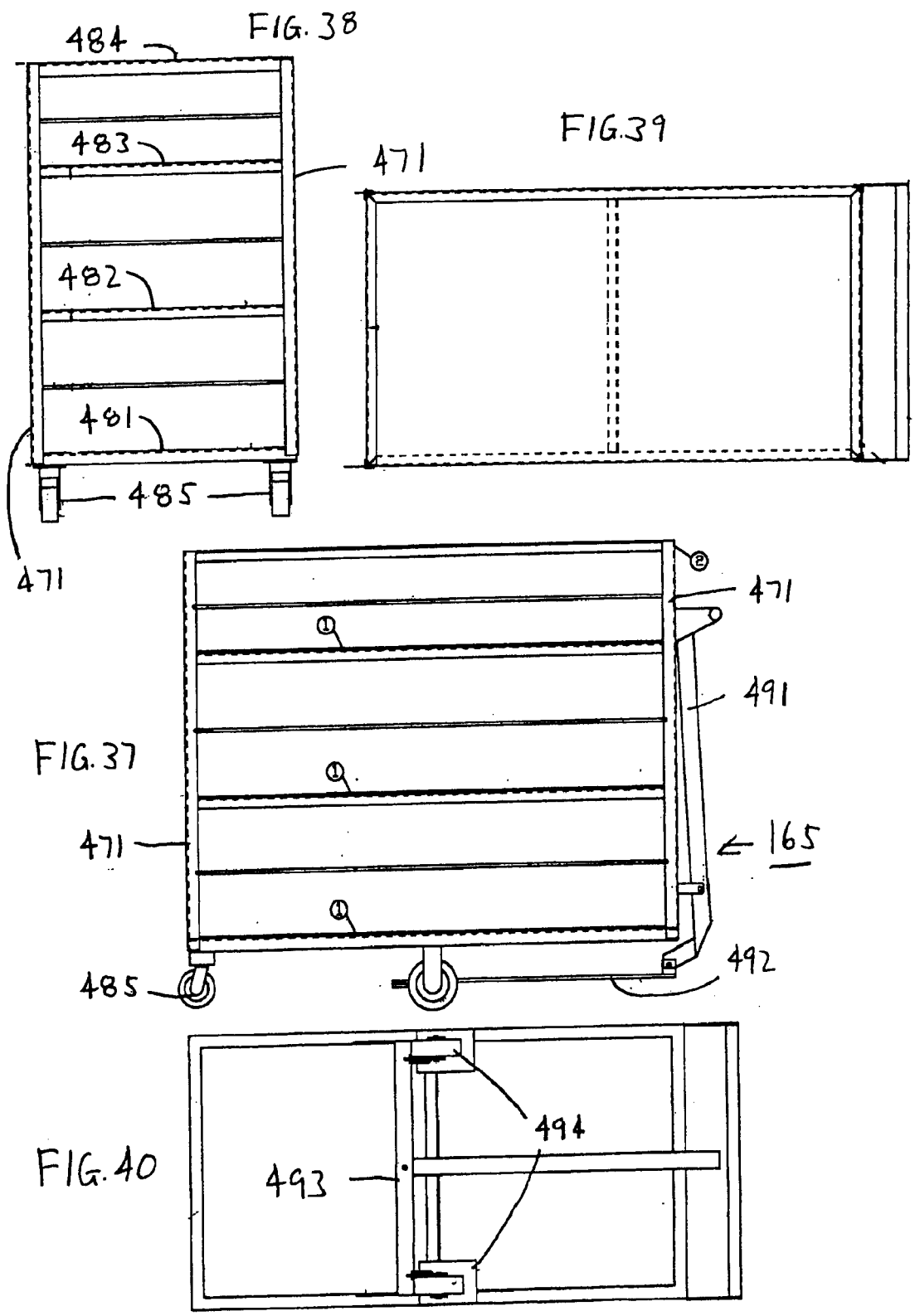

AIRPORT BRIDGE AND LIFT

This application is a continuation-in-part of application Ser. No. 10/192,450, filed Jul. 10, 2002 now U.S. Pat. No. 6,658,685 B1.

BACKGROUND OF THE INVENTION

1. Field of the Invention

The invention relates to a bridge with a lift for use for the passage of passengers and luggage between an airport and an airplane.

2. Description of the Prior Art

U.S. Pat. No. 5,704,086 discloses a telescoping bridge or tunnel comprising an inner rotunda coupled to an airport, and a telescoping walkway or tunnel coupled between the rotunda and an outer cab to be coupled to the door of an airplane for passengers and small luggage. The bridge of the patent can be expanded and retracted and be rotated about a vertical axis at the rotunda. In each telescoping pair of bridge sections, the inner bridge section telescopes within its adjacent outer bridge section.

In another known telescoping bridge in use, in each telescoping pair of bridge sections, the outer bridge section telescopes into its adjacent inner bridge section.

Another known bridge in use is fixed in place and cannot telescope and hence cannot be expanded and retracted.

These bridges are used for the passage of passengers and small carry on luggage to and from the airplane. Large luggage is checked at the ticket counter and loaded and unloaded separately.

In the operation of smaller regional airplanes, the trend is to allow the passengers to carry their larger luggage beyond the ticket counter to the bridge. Airline personnel then can take the luggage to the airplane and load it into the aircraft cargo hold. One known non-telescoping bridge section has a lift attached thereto near the airport building whereby large luggage can be lowered to the ground and then transported to the airplane. Other known lifts are attached to a bridge and use chutes, ramps, or stairs for unloading luggage.

SUMMARY OF THE INVENTION

It is an object of the invention to provide a unique lift which can be attached to a telescoping bridge at its outer cab.

The lift has a carriage that can be moved by a cable and a motor upward or downward and which comprises a platform that has sensing means for controlling the motor for stopping downward movement of the carriage when it engages the ground.

An electrically operated safety catch is provided to prevent the carriage from falling in the event the cable breaks.

A safety system is provided which prevents the bridge from moving if the carriage is not in the up position and the door to the carriage is not closed.

The present invention provides a system for use for the passage of persons and items between an airport building and an airplane. The system comprises a passage structure supported for rotation about a vertical axis next to the building. The passage structure comprises a rotunda, a bridge and a cab. The cab has a first port adapted to be coupled to a port of an airplane for the passage of persons. The bridge comprises a plurality of sections with each section having a rear end and a front end with a passage formed therethrough. The plurality of sections comprises a rear section having its rear end coupled to the rotunda and a forward section having its forward end coupled to the cab. Each of the sections is telescopically coupled to an adjacent section with the front end of the section adjacent to the forward section being movable within the forward section such that the bridge can be expanded and contracted. The passage structure has a second port for the passage of luggage and other items. A housing is coupled to the exterior of the passage structure with an opening located in line with the section port. The housing has an opening in a lower portion. A carriage is supported for movement in the housing for supporting luggage and other items. There is a means for lowering the carriage downward to the ground and upward to the second port for transporting luggage and other items between the passage structure and the ground.

In accordance with one aspect of the present invention the second port is located in the rotunda.

In accordance with another aspect of the present invention the housing bears on the ground and the housing is coupled to a nonrotating portion of the rotunda.

In accordance with still another aspect of the present invention the lower opening has a door.

In accordance with still another aspect of the present invention the housing comprises an upper end and a lower end with surrounding side walls located between the upper and lower ends defining an interior upper zone and a lower zone. The second port extends into the housing in communication with the interior upper zone. Support structure is coupled to the housing for coupling the housing to the passage structure. The carriage is supported for movement between the interior upper zone and the lower zone. The carriage comprises a plurality of leg members having lower ends. A platform for supporting luggage and other items is coupled to said lower ends of said leg members by coupling means such that the platform is located below the lower ends of the leg members and can engage a floor when the carriage is lowered to the lower zone. The lower ends of the leg members and the platform may move toward and away from each other respectively. There is an electric motor and an electric switch that is coupled to the carriage at a position to be controlled by the platform when the platform engages the floor for shutting off the motor.

In accordance with still another aspect of the present invention there is a winch coupled to the housing and a flexible line having a first end coupled to the carriage and a second end coupled to the winch. The electric motor is a reversible motor for rotating the winch in a first direction to lower the carriage and for rotating the winch in a second direction for raising the carriage. A safety assembly prevents the carriage from falling in the event the flexible line breaks. The safety assembly comprises a movable catch. Spring means normally urges the catch in a first position to prevent the carriage from falling. A solenoid moves the catch to a second position to allow the carriage to move from an upper position to a lower position. The catch is movable from the second position to the first position by the carriage when the carriage is moved upward to an upper position.

The present invention also provides an apparatus for use with an elevated structure for lowering and raising luggage between an upper position and a lower position. There is a housing having an upper end and a lower end with surrounding side walls located between the upper and lower ends defining an interior upper zone. A port extends into the housing above the lower end in communication with the interior upper zone. Support structure is coupled to the housing for supporting said housing including said lower end above and spaced from the ground. The lower end portion of the housing has a passageway formed therethrough. A carriage is supported for movement between the interior upper zone and a floor by way of the passageway for carrying luggage and other items between the interior upper zone and the floor. There is a control means for moving the carriage between the interior upper zone and the floor. The carriage comprises a plurality of leg members having lower ends. A platform supports luggage and other items and is coupled to the lower ends of the leg members by coupling means such that the platform is located below the lower ends of the leg members and can engage the floor when the carriage is lowered. The lower ends of the leg members and the platform may move toward and away from each other respectively. There is also an electric motor and an electrical switch coupled to the carriage at a position to be controlled by the platform when the platform engages the floor for shutting down the motor.

In accordance with one aspect of the present invention the apparatus further comprises a winch coupled to the housing. A flexible line has a first end coupled to the carriage and a second end coupled to the electric motor. The electric motor being a reversible motor for rotating the winch in a first direction to lower the carriage and for rotating the winch in a second direction for raising the carriage. A safety assembly prevents the carriage from falling in the event the flexible breaks. The safety assembly comprises a movable catch. Spring means normally urges the catch in a first position to prevent the carriage from falling. A solenoid moves the catch to a second position to allow the carriage to move from an upper position to a lower position. The catch is movable from the second position to the first position by the carriage when the carriage is moved upward to an upper position.

In accordance with still another aspect of the present invention, the apparatus comprises an electrical system for moving the bridge. There is an opening leading to the interior of the housing of the lift from the cab. A door is provided for opening and closing the opening. Also provided is circuitry including a first switch for sensing when the door is in a closed position and second switch for sensing when the carriage is in an up position and for allowing the electrical system to move said bridge only if said door is in a closed position and said carriage is in an up position.

BRIEF DESCRIPTION OF THE DRAWINGS

FIG. 1 is a side view of a bridge and the lift of the invention with the bridge in a retracted position.

FIG. 2 is a top view of the apparatus of FIG. 1.

FIG. 3 is a side view of the apparatus of FIG. 1 with the bridge in an expanded position.

FIG. 4 is a line drawing of a cross-section of the apparatus of FIG. 1 as seen along lines 4—4 thereof.

FIG. 5 is a line drawing of a cross-section of the apparatus of FIG. 1 as seen along lines 5—5 thereof.

FIG. 6 is a cross-section of the apparatus of FIG. 1 as seen along lines 6—6 thereof. In FIG. 6, the bridge section is shown as a line drawing.

FIG. 7 is a side view of the cab of the bridge of FIGS. 1–3 with the lift of the invention attached to the cab.

FIG. 8 is a different side view of the cab of the bridge of FIGS. 1–3 showing a third side of the lift of the invention with its carriage in a lowered position.

FIG. 9 is a line drawing of the lift and carriage of the invention.

FIG. 10 is an inner side view of the frame of the lift with the outer walls of the housing removed.

FIG. 11 is a cross-sectional view of the frame of FIG. 10 as seen along lines 11—11 thereof.

FIG. 12 is a cross-sectional view of the frame of FIGS. 10 as seen along lines 12—12 thereof.

FIG. 13 is a cross-sectional view of the adapter used to secure the lift to the side of cab.

FIG. 14 is a side view of the carriage of the lift.

FIG. 15 is a left end view of the carriage of FIG. 14.

FIG. 18 is a left side view of the lift of FIG. 17.

FIG. 19 is a top view of the lift of FIG. 17.

FIG. 20 is a side view of one of the safety catch devices of the lift with the catch in an out of the way position.

FIG. 21 is a side view of a portion of the catch device of FIG. 24 with the catch in a safety position.

FIG. 22 illustrates the U-shape support of the catch device.

FIG. 23 is a bottom view of the platform of the carriage of the lift.

FIG. 24 is a side view of the platform of FIG. 24.

FIG. 25 is an end view of the platform of FIG. 24.

FIG. 26 illustrates one of the ball joint linkages which couples the edges of the platform to the carriage frame.

FIG. 31 is a view of the door structure of the frame of the lift.

FIG. 32 is a cross-section of the door structure of FIG. 33 as seen along lines 32—32 thereof.

FIGS. 34 and 35 are an electrical schematic of the control system for the bridge and lift. Lines 451A and 453A of FIG. 34 are connected to lines 451B and 453B respectively of FIG. 35.

FIG. 36 is an electrical schematic of additional features of the control system.

FIG. 37 is a side view of a cart used with the lift. In FIG. 37 the rear wheels are not shown for purposes of clarity.

FIG. 38 is an end view of the cart.

FIG. 39 is a top view of the cart.

FIG. 40 is a bottom view of the cart.

DESCRIPTION OF THE PREFERRED EMBODIMENTS

Figure 17:
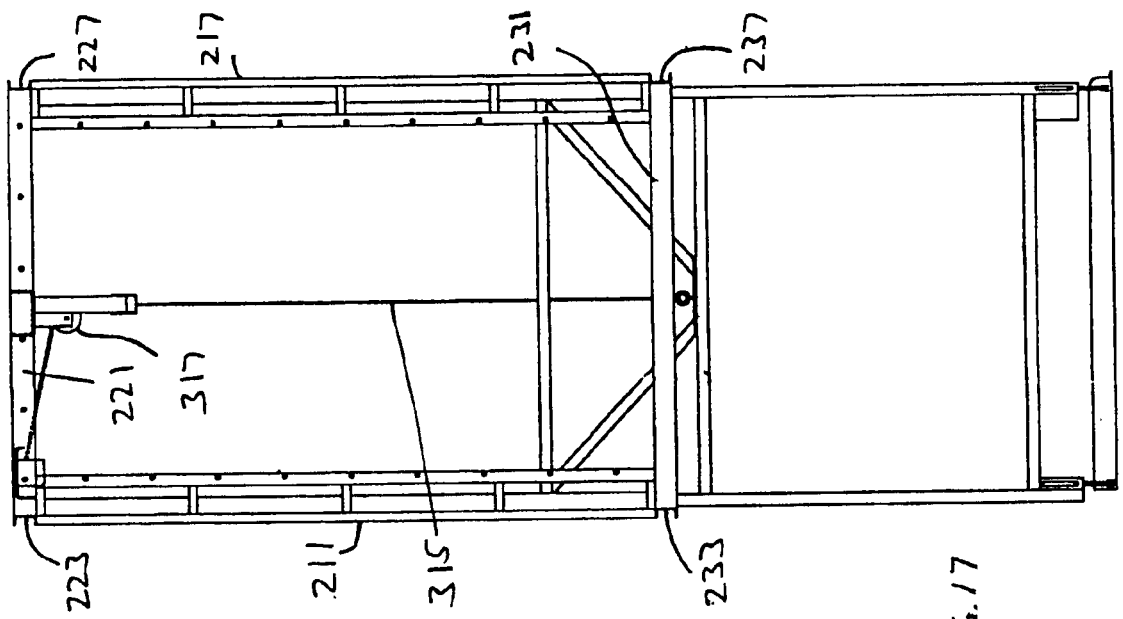
FIG. 17 is an inner side view of the frame of the lift with the carriage located therein.
Figure 16:
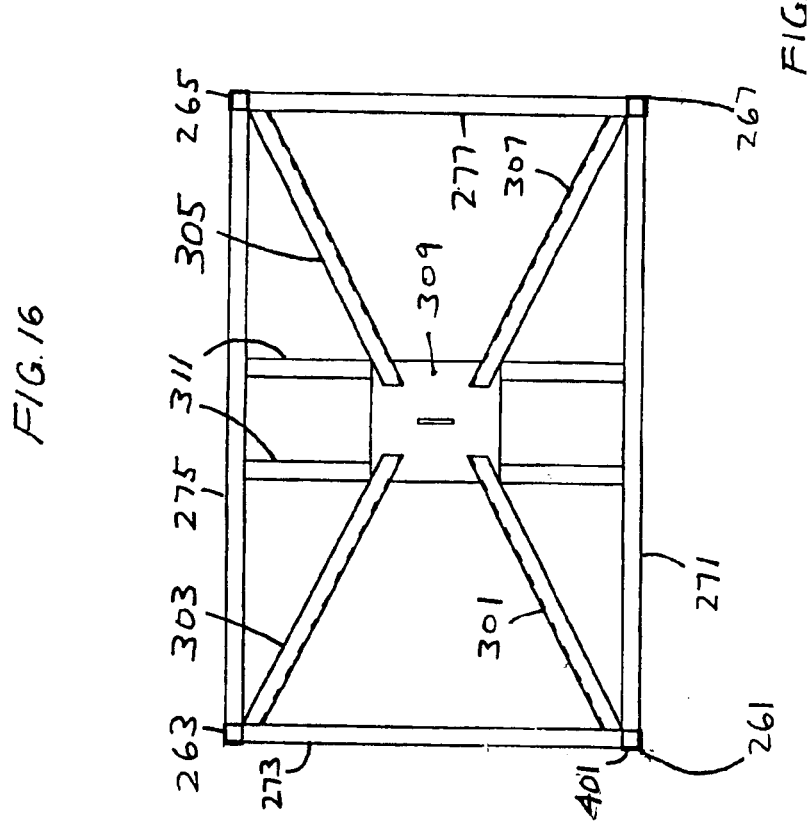
FIG. 16 is a top view of the carriage of FIGS. 14.
Figures 27, 28:
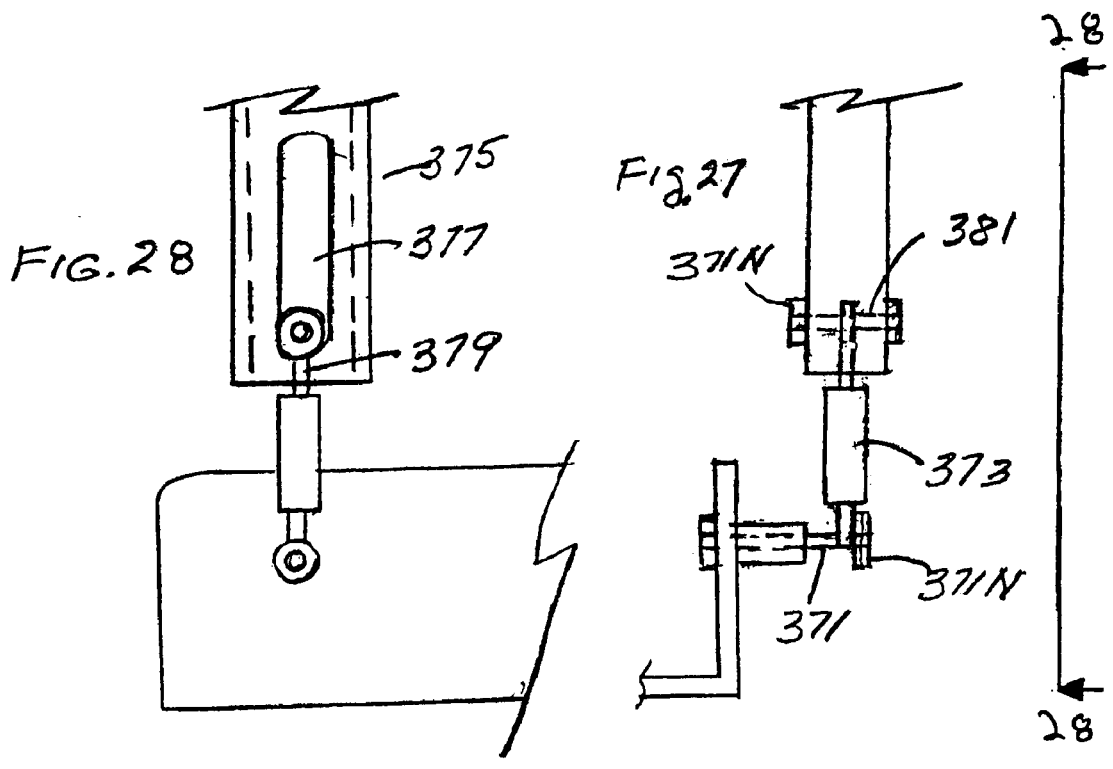
FIG. 27 illustrates one of the ball joints coupling one leg of the carriage to one edge of the platform.
FIG. 28 is a view of the structure of FIG. 27 as seen along lines 28—28 thereof.
Figure 29:
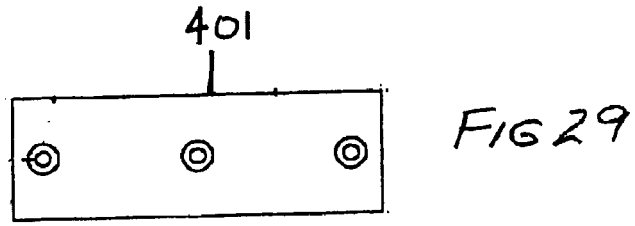
FIG. 29 illustrates one of the wear strips of the carriage and lift frame.
Figure 30:
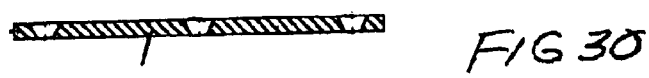
FIG. 30 is a cross-sectional view of the wear strip of FIG. 29.

Referring now to FIGS. 1–8 there will be described a bridge and the lift of the invention. The bridge 101 is similar to that disclosed in U.S. Pat. No. 5,704,086, which patent is incorporated into this application by reference. The bridge 101 is of the telescoping type. The bridge 101 comprises a rotunda 103 which is coupled to an airport structure 105. The rotunda is supported by a pedestal 107 which is coupled to the ground by way of bearings 107B such that the rotunda can rotate about a vertical axis 109. The rotunda has an interior zone for the passage of passengers. Three hollow tunnel or bridge sections 111A, 111B, and 111C are coupled to the rotunda 103. The sections 11A, 11B, 11C are rectangular in cross-section. The bridge section 111A has its inner end 111AI fixedly coupled to the rotunda 103 and its outer end 111O telescopically located in the inner end 111BI of section 111B. The outer end 111BO of section 111B is telescopically located in the inner end 111C1 of section 111C. The outer end 111CO of section 111C is fixedly coupled to a bubble shaped cab 113 having an interior zone for the passage of passengers. The cab 113 has a port 115 adapted to be coupled to a front door of an airplane for the passage of passengers and small luggage.

Two identical lifting devices 121 comprising hollow members 122 are coupled to opposite sides of the section 111C and to lower wheels 123 for supporting the section 111C and hence the sections 111A and 111B and the cab 113 above the ground with the cab 113 located at a level of the door of the aircraft. Thus passengers can pass from the building 105 to the airplane and vice versa by way of the rotunda, bridge sections 111A, 111B, 111C and the cab 113. A reversible AC electric motor 124 is coupled to or screw member located in each member 122. Each screw member is coupled to a rod 125 which is coupled to a wheel base 126 by way of bearings 127. The base 126 is coupled to a hollow axle 128 by way of a bearing 129 and a rod 130. The axle 128 has two DC controlled motors each of which operates one of the wheels 123 such that they may be moved to be parallel with the length of the bridge 101 as shown in FIGS. 1 and 3 and rotated together in the same direction at the same rpm to move the bridge from a retracted position as shown in FIG. 1 to an expanded position as shown in FIG. 3 and vice versa. In moving between the retracted and expanded positions, the section 111B moves radially relative to section A and the section 111C moves radially relative to section 111B. In order to rotate the bridge 101 about the axis 109, one of the wheels 123 may be rotated at a different rpm than the other wheel to allow the wheel assembly 128 to turn about the bearing 129 to allow rotation of the bridge 101 about the axis 109.

Figure 33:
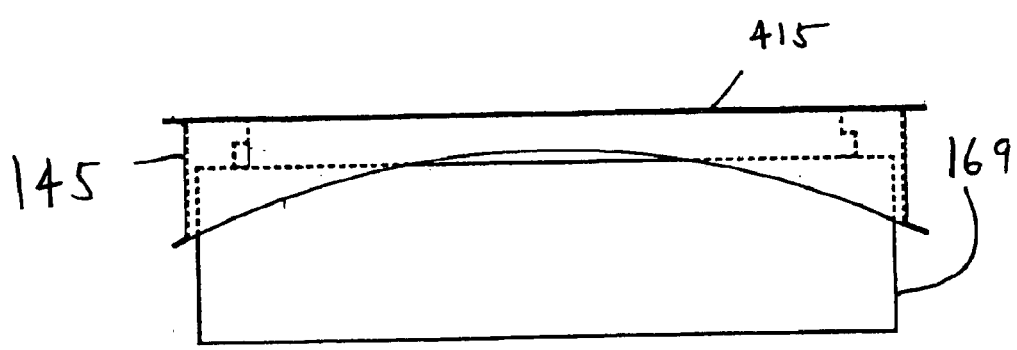
FIG. 33 is a top view of the door structure of FIG. 20.

Coupled to the cab 113 is the lift system 141 of the invention. The lift system 141 comprises a frame 143 (see FIGS. 9–12 and 17–18) which is connected to the cab 113 by an adapter 145 (see FIGS. 13 and 33) on a side nearly opposite the port 115. The bottom of the lift 141 is open. The frame 143 has three outer walls 147, 149, 151 and a top wall 13. The lift 141 includes a carriage (see FIGS. 8 and 9) 161 with a self-leveling platform 163 that can support a cart 165 (see FIG. 8). The carriage 161 can move downward to the ground through the lower opening of the lift housing and upward to the level of the cab 113 through the lower opening. The lift 141 has an inner door opening 167 and a door 169 leading to the interior of the cab by way of an opening 171 formed through the cab wall (see FIGS. 13 and 31–33) such that when the carriage 161 is in an upper position, passengers can place their large luggage on the cart 165. When the cart 165 is full, the carriage can be lowered to the ground and the cart 165 removed and taken to the aircraft cargo hold and the luggage loaded into the aircraft. Upon arrival of the aircraft to its destination, the luggage is loaded onto a similar cart and then taken to a similar lift and raised upward to the bridge to the passengers leaving the aircraft.

By coupling the lift 141 to the cab 113, the lift does not have to be custom built for each bridge since it will always be at a level such that its carriage normally will always contact the ground since the end of the bridge at the cab will always be at the same height for the known smaller regional aircraft. Since the lift is attached to the outer cab 113, it can be used on telescoping bridges of the types shown in FIGS. 1–3 wherein each inner bridge section telescoped into its adjacent outer section.

The cab 113 shown has a movable wall 171 similar to that of a roll up door which can be moved to different positions depending where the port 115 is moved. The port 115 is of the type that can be moved to different positions around the cab 113 between the lift and the end 113A of the cab. The cab 113 next to lift wall 151 has a door 181 with stairs 183 extending between the lower end o the door 181 and the ground.

Referring now to FIGS. 9–13 and 17–19 there will be described the lift 141 in detail. In these drawings the outer walls of the lift housing are not shown. The frame 143 of the lift is rectangular in shape at the top and bottom ends, and at the four sides defining an interior space 201 in the form of a rectangular prism in which is located the carriage 161. Four vertical members 211, 213, 215, 217 have connected thereto four horizontal members 221, 223, 225, 227 at the top and four horizontal members 231, 233, 235, 237 at the bottom to form the frame 141. Cross members 241 and 243 are provided for additional support. The inner frame members 211 and 217 each comprises two L-shaped metal members 216A and 216B with cross braces 216C with members 216A having apertures 219 for receiving bolts 221 for attaching the frame 143 to the adapted 145. The adapter 145 is attached to the side of the cab 115 by bolts (not shown). The bottom of the lift frame 141 formed by members 231, 233, 235 and 237 defines a rectangular opening 245 for passage of the carriage 161.

Referring to FIGS. 9 and 14–19, the carriage 161 is rectangular in shape at the top and bottom ends and at its four sides defining an interior space 251 in the form of a rectangular prism. Four vertical members 261, 263, 265, and 267 have connected thereto, four horizontal members 271, 273, 275, 277 near the top; four lower horizontal members 281, 283, 285, and 287 and four horizontal members 291, 293, 295, and 297 at the bottom. Four angled members 301, 303, 305, and 307 are connected to horizontal members 273 and 277 extend downward and are connected to a plate 309 which is connected to bars 311. Bars 311 are connected to member s 281 and 285.

A U-shaped member 313 is connected to plate 309 to allow a cable 315 to raise and lower the carriage 161. The cable 315 extend around a sheave 317 and is connected to a reversible electrically operated winch 319. The sheave is rotatably supported by plates 321 which are connected to a plate 323 which is connected to horizontal members 221 and 225 of lift frame 141. The winch 319 is supported by a plate 325 which is connected to vertical members 211 and 213.

Two safety catch assemblies 341 are connected to plate 323 to prevent the carriage 161 from falling in the event the cable 315 breaks. The two catch assemblies are identical and only one catch assembly 341 will be described. Referring to FIG. 20–22 the catch assembly 341 comprises a U-shaped support 343 and a catch member 347 which is pivotally coupled to the member 343 by a rod 351 on the outside of the U-member 343. Also fixedly coupled to the rod 351 inside the U of the support 343 is a linkage 353. A solenoid 355 inside the U of the support 343 has a linkage 357 pivotally coupled to the linkage 353. A tension spring 359 is attached to the rod 351 and has its arm 361 located against a wall. When the solenoid 355 is electrically energized, the linkage 357 is moved downward moving the catch member 347 upward out of the way as shown on the right side of FIG. 20 to allow the carriage to move downward. When the solenoid 355 is de-energized the torsion spring 359 urges the catch member 347 of the support 343 to a safety position as shown in FIG. 21. When the carriage 161 moves upward, the solenoids 355 are de-energized and the upper horizontal members 271 and 275 of the carriage 161 push the latches 347 out of the way and move upward above the catch members 347. The springs 359 return the latches 347 to the safety positions as shown in FIG. 21. Luggage from passengers in the cab 113 of the bridge 101 then may be loaded on to the carriage 161. In order to move the carriage 161 downward to the ground the solenoids 355 are energized causing the catch members 347 to be moved upward out of the way of the carriage arms 271 and 275.

Referring now to FIGS. 23–28, the platform 163 of the carriage 161 comprises a flat bottom member 163B having two side members 163S. Each side member 163S has two tubular apertures 163A for receiving a bolt 371. Four ball joints 373 are used to couple the platform 161 to the four legs 375 of the carriage 161. Each leg 375 has an elongated slot 377 formed therethrough with a lower aperture 379 extending to the slot 377. Each ball joint 373 has two opposite heads 373H1 and 373H2 with apertures 373A1 and 373A2 extending therethrough. For each leg 375, a bolt 371 extends through the aperture 373A2 and a bolt 381 extends through the aperture 373A1 and through the slot 377 of the leg. Nuts 371N and 381N secure the ball joint to the bolts 371 and 381 respectively. Each ball joint 373 can pivot about the bolts 371 and 381 and move up and down in the slot 377. As the carriage 161 is lowered to the ground, it will be tilted a small amount since the bridge 101 is tilted downward in one example, of the order of 1 inch for each 12 inches of length of the bridge. In FIGS. 8 and 14 the outside edge of the platform 163 is indicated at 163S. Thus the outside edge of the carriage and its platform 163 will touch the ground initially. The carriage can be lowered further until the platform 163 engages an electrical switch 391 (see FIG. 14) which produces a signal to stop the motor of the winch 319.

Referring to FIGS. 11, 12, 14, 15, 29, 30 plastic wear strips 401 are attached to the outside corners of the vertical frame members 261, 263, 265, 267 of the carriage 141 at their upper ends and on the inner sides of the frame members 211, 213, 215, 217 of the lift frame 143 to guide vertical movement of the carriage 161 as it moves up and down in the lift frame 143. The strips 401 may be formed of UHMW.

Referring now to FIGS. 2, 7, 13 and 31–33, the wall 171 of the cab 113 terminates at 171A leaving an opening between lines 171A and 171B. The adapter 145 has side walls 413 attached to the outside of the cab around the opening between lines 171A and 171B. The outer side 415 of the adapter 145 has an opening 417 formed therethrough between lines 417A and 417B. Vertical supports 419 are secured to the outer wall 413 of the adapter next to the opening 417. Secured to the supports 419 at an upper level is a frame 421 which supports a rod 423. The rod 423 supports the roll up door 169 such that the door 169 can be pulled down to close the opening 417 or moved up to allow access to the opening 417.

Figure 35:
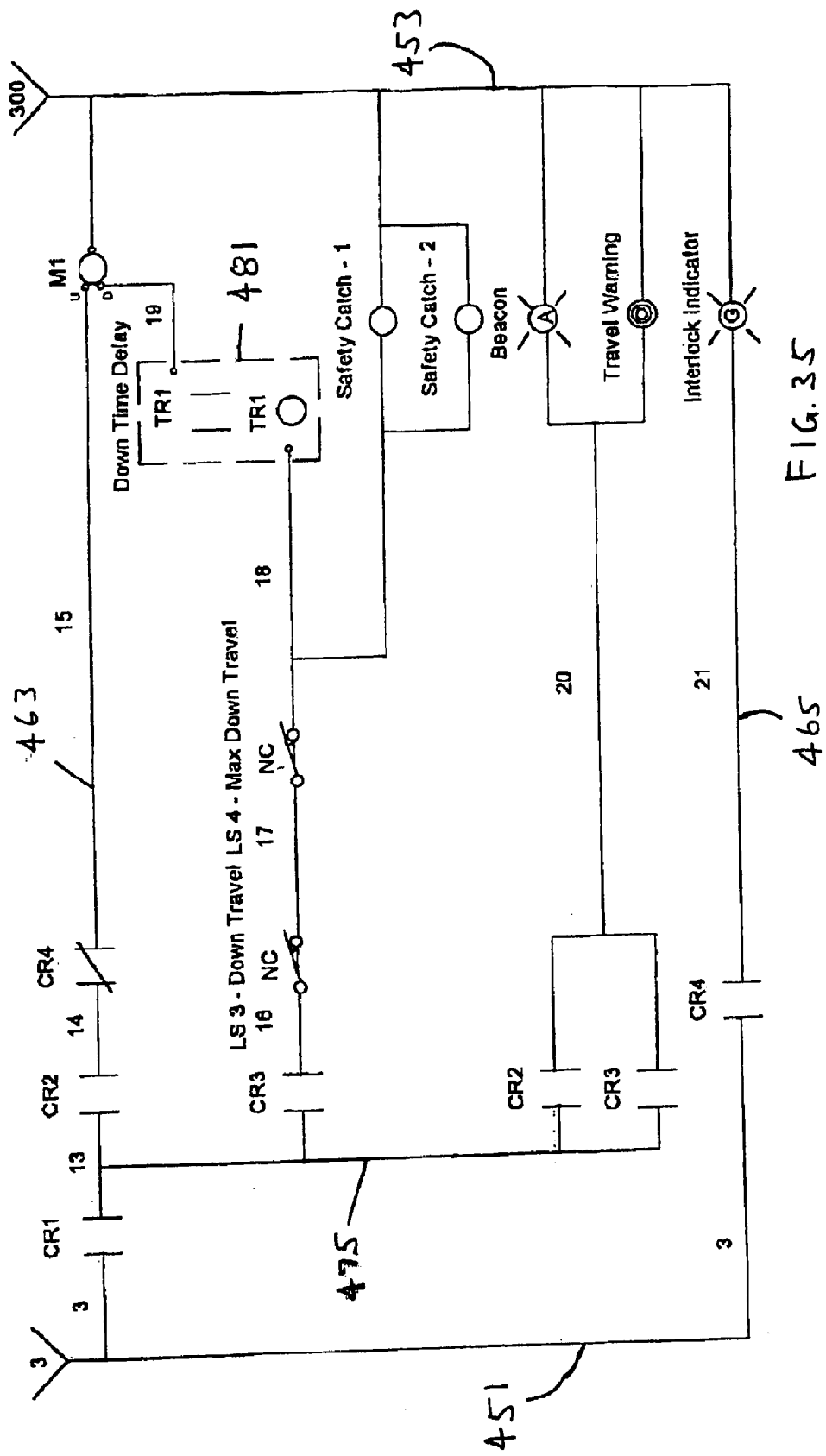

Referring to FIGS. 34–36, the electrical system of the bridge 101 and lift 141 will be described. Leads 451 and 453 are coupled to 110 Volts A.C. Leads 455, 457, 459, 461, 463 and 465 are connected between leads 451, 453.

Member 1DISC is a disconnect switch and member 1FU is a fuse ESTOP1 and ESTOP2 are normally closed interior and exterior emergency stop switches.

Switch LS1 is a normally open switch held closed by the lower end of the roll-up door 169 when it is in a closed (down) position. Switch LS2 is a normally open switch held closed by the lift 141 when the carriage 161 is in an up position. In this condition, coil of relay CR1 is energized. This closes normally open contacts CR1 of FIG. 34 which closes normally open contacts CR4 of FIG. 36. The circuit of FIG. 35 allows the bridge 101 to be driven. Contacts CR4 are in electrical lead 471 which applies AC power to the electrical motors of the bridge 101 when contacts CR4 of FIG. 36 are closed.

If the door 169 is not down and the carriage 161 is not up, the bridge 101 cannot be driven (expanded or retracted or rotated) unless the by pass switch 473 is closed. It takes two persons to press the by-pass switch 473 and one to drive the bridge 101.

Relay coils CR2 and CR3 control the up and down movement of the carriage 161. When the door 169 is closed and LS1 is closed by the door, relay coil CR1 is energized which closes normally open contacts CR1 of FIG. 35. This applies a voltage to lead 475 of FIG. 35. If the lift is in a down position and the up button UP1 is pressed, the CR2 relay is energized which closes the upper CR2 contacts of FIG. 35 causing the winch motor M1 to operate to move the carriage upward, and closes the lower CR2 contacts of FIG. 35 which actuates a beacon light and a travel warning light.

When the lift 141 reaches the up position, normally open switch LS2 is closed and relay CR4 is energized which opens the upper CR4 contacts of FIG. 35 and closes the lower CR4 contacts of FIG. 35. This stops the motor M1 and actuates the interlock indicator.

If the lift door is closed and the carriage is at the up position, relay CR1 is energized. If the down button DN1 is pushed, the CR3 relay is energized which closes contacts CR3 and current is applied to the two solenoids of the safety catches, by way of normally closed switches LS3 and LS4, which moves their latches 347 out of the way. LS3 is the limit switch 391 of the platform 163 which is normally closed. When the platform 163 contacts the ground it opens LS3 and stops downward movement of the carriage.

Switch LS4 is normally closed. Its purpose is to stop downward travel of the carriage if the bridge is too high and the platform of the carriage cannot contact the ground. It is opened by a lower trip member (not shown) which is attached to the outside of the housing of the lift 141.

When the down button is pushed, the current to the motor M1 is delayed by delay circuit 481 to allow the safety catch relays to be actuated first to move the latches 347 out of the way before the motor M1 turns the winch to move the carriage down.

The interlock indicator is a green light which is actuated when the carried door is closed and the carriage is in the up position. The light is visible to the operator.

Referring to FIGS. 37–40, the cart 165 comprises four legs 471 (only three are shown) for supporting four shelves 481–484. A wheel 485 is connected to the lower end of each leg although the rear wheels are not shown. Members 491, 492, and 493 and wheels 494 form a brake for the cart 165.

Figure 41:
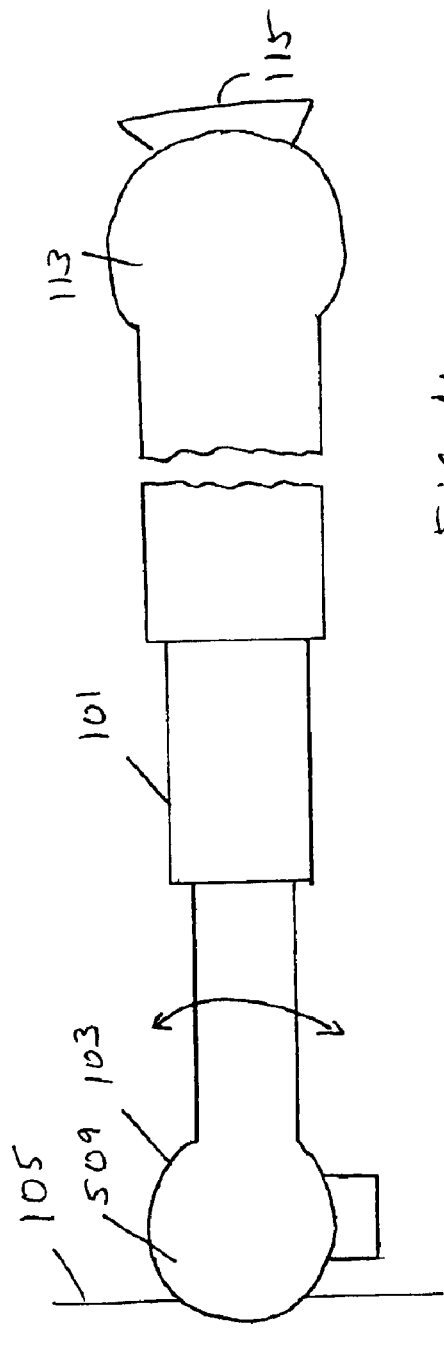
FIG. 41 is a top view of a rotunda section of a bridge, equipped with the lift of the present invention, in accordance with another embodiment.
Figure 42:
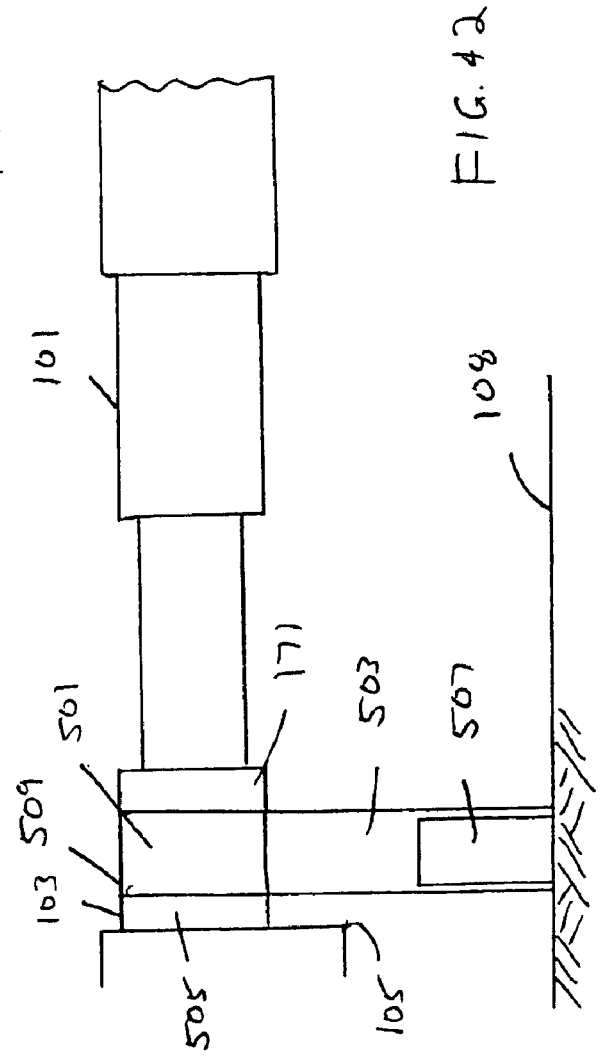
FIG. 42 is a side elevational view of the rotunda section and lift of FIG. 41.

FIGS. 41 and 42 show the lift 501 in accordance with another embodiment. The lift 501 is substantially similar to that described above except that the lift is installed onto the rotunda 103 of the bridge 101. Installing the lift 501 on the rotunda 103 is particularly useful where the cab 113 (see FIGS. 1 and 41) of the bridge must rotate a significant amount in a clockwise direction to match the aircraft's position.

In many bridge installations, the longitudinal axis of the aircraft is generally parallel to the longitudinal axis of the bridge. Thus, the bridge and fuselage of the aircraft are generally parallel to each other. However, if the aircraft fuselage is oriented more transversely to the bridge, then the cab port 115 must rotate clockwise to match the door to the aircraft. In some circumstances, the cab port 115 (see FIG. 41) must rotate to a position that is roughly diametrically opposite to the bridge 101, wherein the lift could interfere with such rotation and freedom of movement of the cab.

The lift 501 has an extension 503 that depends from the bottom of the lift to the ground 108. The extension 503 is a rectangular tube, with walls and structural supports, that extends the lift housing down to the ground 108. The height of the rotunda 103 above the ground is fixed. The extension encloses the pathway of the carriage and supports wear guides for the carriage on the inside. In addition, the extension 503 supports the lift 501 on the ground. The lift 501 and the extension 503 are stationary with respect to the rotunda. Thus, the rotunda 103 can rotate, while the lift 501 and extension 503 remain stationary.

The lift 501 is coupled to the rotunda 103 by way of the adapter 145 shown in FIG. 13. The rotunda side of the adapter 145 may need to be modified from use on the cab, as the radius, curvature and height of the rotunda may differ from that of the cab. The adapter is coupled to the roof 509 of the rotunda, which is stationary. A flexible seal extends along the top and sides of the adapter to provide a weatherproof coupling. A movable wall 171 is located on the side of the rotunda between the lift and the bridge. A fixed wall 505 is located on the side of the rotunda between the lift and the terminal building 105. The lift limits the movement of the rotunda somewhat in the right direction (when the observer is inside the rotunda, back to the terminal building) but does not limit the rotation to the left.

The controls for rotating the rotunda have limit switches that limit the rotunda rotation in the right and left directions. The right limit switch is set so as to limit the rotation of the rotunda to the right, so as not to interfere with the lift.

The extension 503 has a door 507 at ground level to provide access to the interior of the lift. The door can be made of a mesh or grid to minimize the risk of the wind blowing the door closed.

The foregoing disclosure and showings made in the drawings are merely illustrative of the principles of this invention and are not to be interpreted in a limiting sense.

What is claimed is:

1. A system for use for the passage of persons and items between an airport building and an airplane, comprising:
    a passage structure supported for rotation about a vertical axis next to said building, said passage structure comprising a rotunda, a bridge and a cab;
    said cab having a first port adapted to be coupled to a port of an airplane for the passage of persons;
    said bridge comprising a plurality of sections with each section having a rear end and a front end with a passage formed therethrough;
    said plurality of sections comprising a rear section having its rear end coupled to said rotunda and a forward section having its forward end coupled to said cab;
    each of said sections being telescopically coupled to an adjacent section with said front end of said section adjacent to said forward section being movable within said forward section, such that said bridge may be expanded and contracted;
    said passage structure having a second port for the passage of luggage and other items;
    a housing coupled to the exterior of said passage structure with an housing opening located in line with and attached around said second port;
    said housing having a lower opening in a lower portion;
    a carnage supported for movement in said housing for supporting luggage carriage and other items; and
    means for lowering said carriage downward to the ground and upward to the second port for transporting luggage and other items between said passage structure and the pound.

2. The system of claim 1 wherein said second port is located in the rotunda.

3. The system of claim 2 wherein said housing bears on the ground and said housing is coupled to an nonrotating portion of said rotunda.

4. The system of claim 1 wherein said lower opening has a door.

5. The system of claim 1, wherein:
    said housing comprises an upper end and a lower end with surrounding side walls located between said upper and lower ends defining an interior upper zone and a lower zone;
    said second port extends into said housing in communication with said interior upper zone;
    support structure coupled to said housing for coupling said housing to the passage structure;
    said carriage being supported for movement between said interior upper zone and said lower zone;
    said carriage comprising a plurality of leg members having lower ends;
    a platform for supporting luggage and other items coupled to said lower ends of said leg members by coupling means such that said platform is located below said lower ends of said leg members and can engage a floor when said carriage is lowered to the lower zone;
    said lower ends of said leg members and said platform may move toward and away from each other respectively;
    an electric motor; and
    an electrical switch coupled to said carriage at a position to be controlled by said platform when said platform engages the floor for abutting off said motor.

6. The system of claim 5, comprising:
    a winch coupled to said housing;
    a flexible line having a first end coupled to said carriage and a second end coupled to said winch;
    said electric motor being a reversible motor for rotating said winch in a first direction to lower said carriage and for rotating said winch in a second direction for raising said carriage;
    a safety assembly for preventing said carriage from failing in the event said flexible line breaks;
    said safety assembly comprising a movable catch;
    spring means for normally urging said catch in a first position to prevent said carriage from falling;
    a solenoid for moving said catch to a second position to allow said carriage to move from an upper position to a lower position;
    said catch being movable from said second position to said first position by said carriage when said carriage is moved upward to an upper position.

* * * * *